R. S. MAXWELL.
AUTOMOBILE TRUCK.
APPLICATION FILED AUG. 2, 1915.
1,204,049.
Patented Nov. 7, 1916.
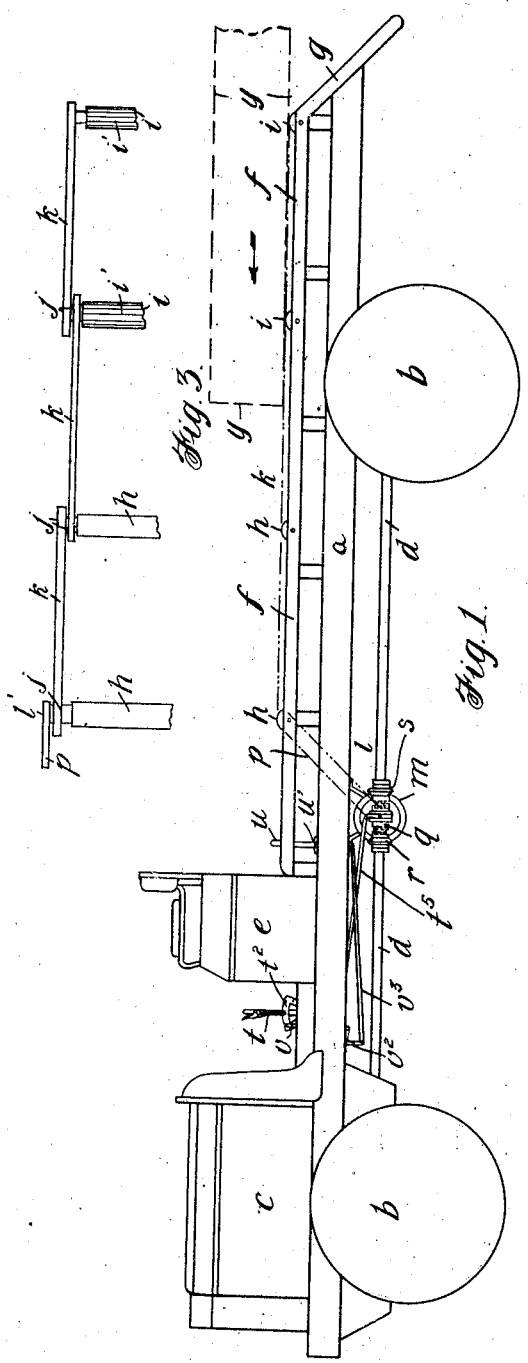
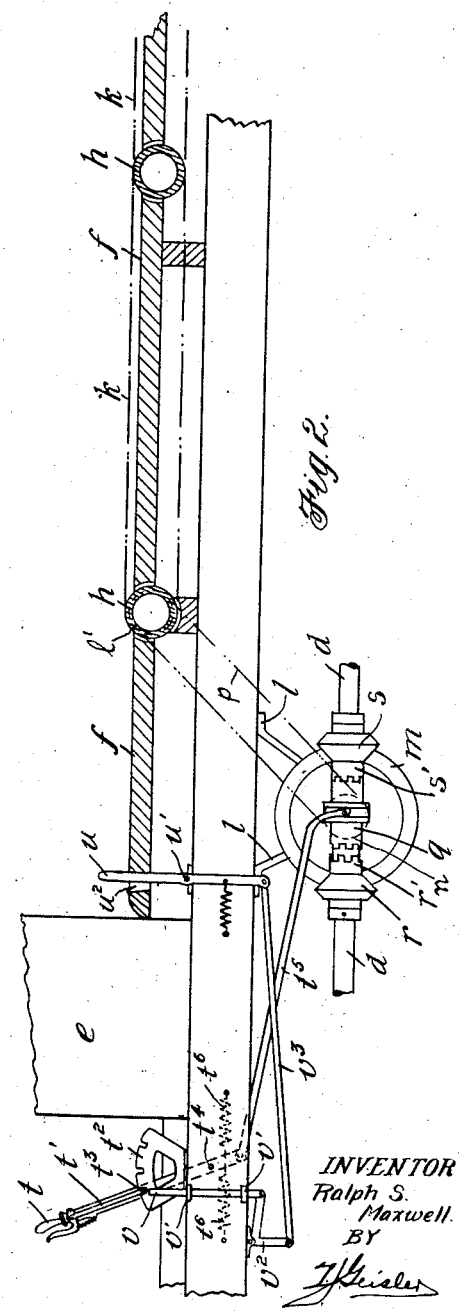
INVENTOR
Ralph S. Maxwell.
BY
ATTORNEY

UNITED STATES PATENT OFFICE.

RALPH S. MAXWELL, OF PORTLAND, OREGON, ASSIGNOR OF ONE-HALF TO JULIA M. PARKER, OF PORTLAND, OREGON.

AUTOMOBILE-TRUCK.

1,204,049.   Specification of Letters Patent.   Patented Nov. 7, 1916.

Application filed August 2, 1915. Serial No. 43,328.

*To all whom it may concern:*

Be it known that I, RALPH S. MAXWELL, a citizen of the United States, and resident of Portland, county of Multnomah, State of Oregon, have invented a new and useful Improvement in Automobile-Trucks, of which the following is a specification.

This invention relates to improvements of automobile trucks, and has particularly to do with the providing of live transverse rolls journaled in the floor of the truck, and adapted to bear the load which is to be carried on said truck. Prior to my invention, the transverse rolls in the floor of auto trucks were dead rolls, and this invention provides means for changing these dead rolls to live rolls. Auto trucks embodying this feature are used for portable bodies which have been previously loaded. In transferring these portable bodies from the yard truck to the auto truck, the method used prior to my invention was to merely push the load forward manually on the dead rolls, these latter acting as roller bearings. However, my invention provides a power operated means for driving these rolls, thereby transforming said rolls from roller bearings into live traction rolls which pull the load onto the truck.

One of the main objects of my invention is to provide live rolls in the floor of the auto truck.

Another of the main objects of my invention is to provide a convenient form of reversible driving gear by means of which these live rolls may be driven in either direction by power taken from the propeller shaft of the automobile.

A further object of my invention is to provide means for placing this driving mechanism in neutral position, when the portable body being loaded on the truck has reached a certain position.

The features of my invention are all fully shown in the accompanying illustrations, in which:

Figure 1 is a diagrammatic side elevation of an auto truck embodying my invention. Fig. 2 is a larger sized sectional detail showing the constructive details of the invention, and Fig. 3 is a plan view showing the means by which the live rolls are connected so as to cause them to move synchronously in the same direction.

The auto truck comprises the chassis, mounted on wheels $b$. The power plant hood is indicated by $c$, $d$ is the propeller shaft, $e$ is the driver's seat, $f$ is the floor, and $g$ is an inclined tail gate. Transverse rolls $h$ and $i$ are journaled in the floor of the truck, and project slightly above the latter being adapted to bear the load to be carried by said truck.

My invention consists of the following changes in and additions to the parts already mentioned.

The rolls $i$ are corrugated longitudinally as indicated at $i'$ in Fig. 3, and all rolls are provided on one end with sprockets $j$, said sprockets being connected by the chain drives $k$ as indicated also in Fig. 3. Bearing brackets $l$ are pendant beneath the body of the truck, and a transverse shaft bearing on one end a beveled gear $m$, and on the other end a sprocket $n$ is rotatably supported by said brackets $l$. On the foremost roll $h$ is fixed an additional sprocket $l'$, and a chain drive $p$ connects the sprockets $n$ and $l'$. A double clutch sleeve $q$ is slidably splined on the propeller shaft $d$, and the bevel pinions $r$ and $s$ are loosely mounted on said shaft on opposite sides of the clutch sleeve. The bevel pinions $r$ and $s$ are provided with the clutch collars $r'$ and $s'$ adapted to be respectively engaged by the adjacent jaw ends of the clutch sleeve when the latter is shifted longitudinally. The pinions $r$ and $s$ are in engagement at all times with the gear $m$. When the clutch sleeve $q$ is in clutch engagement with the bevel pinion $s$ as shown in Fig. 2, the rolls $h$ and $i$ will be driven in a counter clockwise direction so as to carry the load forward on the truck, *i. e.* to the left, having reference to Fig. 1. Conversely when the clutch sleeve is shifted forward so as to engage with the bevel pinion $r$, the rolls $h$ and $i$ will be driven clockwise so as to unload the portable body carried by the rolls. A clutch lever $t$ is provided with a locking bar $t'$ adapted to engage with the notches of a quadrant $t^2$. Said bar $t'$ is furthermore provided with a lateral lug $t^3$. The lever $t$ is pivoted at $t^4$ and is connected to the clutch sleeve $q$ by a link $t^5$. Balance springs tend to hold the lever in neutral position. When the parts are positioned as shown in Fig. 2, the portable body which is indicated by the broken lines $y$ in Fig. 1 will be carried forward onto the truck. As a precaution for preventing the load from being carried too far forward, an auxiliary automatic clutch shifting device is provided as follows: A trip lever $u$ is pivoted at $u'$, and projects upward through a slot $u^2$ of the floor $f$. Said projecting lever is located directly behind the seat $e$, and lies in the path of the portable body, as the latter is being loaded on the truck. A reciprocable rod $v$ is mounted in the guides $v'$ and adjacent the forward notch of the quadrant $t^2$. Said rod is connected to one arm of a bellcrank $v^2$ which is pivoted below the body of the truck. The other arm of said bell crank is connected to the lever $u$ by a link $v^3$. When the truck is being loaded, the clutch lever $t$ will be in the position shown in Fig. 2, and the bar $t'$ will be in engagement with the forward notch of the quadrant. When the body $y$ contacts with the projecting trip lever $u$, the rod will be raised by means of the link and bell crank connections previously mentioned. Said rod will thereupon contact with the lug $t^3$ and the clutch lever will be released. The balance springs $t^6$ will then throw said lever into neutral position, thereby disengaging the driving gear of the rolls, and causing the body $y$ to come to rest.

I claim:

1. The combination with an auto truck having a longitudinal drive-shaft, of a plurality of carrying rollers transversely journaled on the body of the truck, a transverse jack-shaft, supported beneath the truck, a beveled gear fixed thereon, reversing pinions loosely mounted on said drive shaft and in mesh with said gear, said pinions made with clutch collars, and a clutch sleeve longitudinally movable on said drive shaft between said pinions, a driving connection from said transverse shaft to one of said rollers, driving connections from such roller to the other rollers, and means for throwing said longitudinally movable clutch sleeve into engagement with the clutch collar of either of said pinions.

2. In an automobile truck provided with transverse rolls journaled in the floor of the truck, connections between adjacent rolls for causing them to rotate in the same direction, driving gear connecting said rolls to the propeller shaft of the truck, means for controlling said driving gear, and means operated by the forward movement of the load on the truck for placing the driving gear in neutral position when said load reaches a predetermined position.

3. In an automobile truck provided with transverse rolls journaled in the floor of the truck, connections between adjacent rolls for causing them to rotate in the same direction, reversible driving gear connecting said rolls to the propeller shaft of the truck, a clutch lever for controlling said reversible driving gear, said clutch lever being provided with a locking bar, and means operated by the forward movement of the load on the truck for unlocking the clutch lever when said load reaches a predetermined position.

4. In an automobile truck provided with transverse rolls journaled in the floor of the truck, connections between adjacent rolls for causing them to rotate in the same direction, reversible driving gear connecting said rolls to the propeller shaft of the truck, a clutch lever for controlling said reversible driving gear, said clutch lever being provided with a locking bar, and means operated by the forward movement of the load on the truck for unlocking the clutch lever when said load reaches a predetermined position, said means comprising a trip lever, a rod underlying the locking bar of the clutch lever, and connections between the trip lever and the rod, so arranged that the rocking of the trip lever will elevate the rod and thereby unlock the clutch lever.

5. In an automobile truck provided with transverse rolls journaled in the floor of the truck, connections between adjacent rolls for causing them to rotate in the same direction, reversible driving gear connecting said rolls to the propeller shaft of the truck, a clutch lever for controlling said reversible driving gear, said clutch lever being provided with a locking bar, and means operated by the forward movement of the load on the truck for unlocking the clutch lever when the said load reaches a predetermined position, said means comprising a trip lever, a rod underlying the locking bar of the clutch lever, and connections between the trip lever and the rod, so arranged that the rocking of the trip lever will elevate the rod and thereby unlock the clutch lever, and means for returning said clutch lever to neutral position.

6. In an automobile truck provided with transverse rolls journaled in the floor of the truck, connections between adjacent rolls for causing them to rotate in the same direction, reversible driving gear connecting said rolls to the propeller shaft of the truck, a clutch lever for controlling said reversible driving gear, said clutch lever being provided with a locking bar, and means operated by the forward movement of the load on the truck for unlocking the clutch lever when said load reaches a predetermined position, said means comprising a trip lever, a rod underlying the locking bar of the clutch lever, and connections between the trip lever and the rod, so arranged that the rocking of the trip lever will elevate the rod and thereby unlock the clutch lever, and balance springs for returning said clutch lever to neutral position.

7. In an automobile truck provided with transverse rolls journaled in the floor of the truck, connections between adjacent rolls for causing them to rotate in the same direction, reversible driving gear connecting said rolls to the propeller shaft of the truck, a clutch lever for controlling said reversible driving gear, said clutch lever being provided with a locking bar, a lug on said bar, and means operated by the forward movement of the load on the truck for unlocking the clutch lever when said load reaches a predetermined position, said means comprising a trip lever, a rod underlying the lug on the locking bar of the clutch lever, and connections between the trip lever and the rod, so arranged that the rocking of the trip lever will elevate the rod and thereby unlock the clutch lever.

8. In an automobile truck provided with transverse rolls journaled in the floor of the truck, connections between adjacent rolls for causing them to rotate in the same direction, reversible driving gear connecting said rolls to the propeller shaft of the truck, a clutch lever for controlling said reversible driving gear, said clutch lever being provided with a locking bar, a lug on said bar, and means operated by the forward movement of the load on the truck for unlocking the clutch lever when said load reaches a predetermined position, said means comprising a trip lever, a rod underlying the lug on the locking bar of the clutch lever, and connections between the trip lever and the rod, so arranged that the rocking of the trip lever will elevate the rod and thereby unlock the clutch lever, and means for returning said clutch lever to neutral position.

9. In an automobile truck provided with transverse rolls journaled in the floor of the truck, chain gear connecting adjacent rolls so as to cause them to rotate in the same direction, reversible driving gear connecting said rolls to the propeller shaft of the truck, a clutch lever for controlling said reversible driving gear, said clutch lever being provided with a locking bar, and means operated by the forward movement of the load on the truck for unlocking the clutch lever when said load reaches a predetermined position.

10. In an automobile truck provided with transverse rolls journaled in the floor of the truck, chain gear connecting adjacent rolls so as to cause them to rotate in the same direction, reversible driving gear connecting said rolls to the propeller shaft of the truck, a clutch lever for controlling said reversible driving gear, said clutch lever being provided with a locking bar, and means operated by the forward movement of the load on the truck for unlocking the clutch lever when said load reaches a predetermined position, said means comprising a trip lever, a rod underlying the locking bar of the clutch lever, and connections between the trip lever and the rod, so arranged that the rocking of the trip lever will elevate the rod and thereby unlock the clutch lever.

11. In an automobile truck provided with transverse rolls journaled in the floor of the truck, chain gear connecting adjacent rolls so as to cause them to rotate in the same direction, reversible driving gear connecting said rolls to the propeller shaft of the truck, a clutch lever for controlling said reversible driving gear, said clutch lever being provided with a locking bar, a lug on said bar, and means operated by the forward movement of the load on the truck for unlocking the clutch lever when said load reaches a predetermined position, said means comprising a trip lever, a rod underlying the lug on the locking bar of the clutch lever, and connections between the trip lever and the rod, so arranged that the rocking of the trip lever will elevate the rod and thereby unlock the clutch lever.

RALPH S. MAXWELL.